US008958091B2

(12) United States Patent
Suzuki

(10) Patent No.: US 8,958,091 B2
(45) Date of Patent: Feb. 17, 2015

(54) IMAGE-FORMING SYSTEM, IMAGE-FORMING DEVICE, AND IMAGE-FORMING SYSTEM CONTROL METHOD

(75) Inventor: Atsushi Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 199 days.

(21) Appl. No.: 13/559,771

(22) Filed: Jul. 27, 2012

(65) Prior Publication Data

US 2013/0027737 A1 Jan. 31, 2013

(30) Foreign Application Priority Data

Jul. 28, 2011 (JP) ................................ 2011-165431

(51) Int. Cl.
*G06K 15/00* (2006.01)
*G03G 15/00* (2006.01)

(52) U.S. Cl.
CPC ........ *G03G 15/5016* (2013.01); *G03G 15/5079* (2013.01); *G03G 2215/00109* (2013.01)
USPC .......................................... 358/1.14; 345/505

(58) Field of Classification Search
CPC ...................... G03G 15/5016; G03G 15/5079
See application file for complete search history.

(56) References Cited

U.S. PATENT DOCUMENTS

2007/0133843 A1* 6/2007 Nakatani ...................... 382/115

FOREIGN PATENT DOCUMENTS

| | | | |
|---|---|---|---|
| JP | 11-306445 | A | 11/1999 |
| JP | 2007-264453 | A | 10/2007 |
| JP | 2010-016563 | A | 1/2010 |

OTHER PUBLICATIONS

English Abstract and Machine Translation for JP 11-306445 A, published Nov. 5, 1999.
English language abstract and machine translation of of JP 2010-016563 A, published Jan. 21, 2010.
English language abstract and machine translation of of JP 2007-264453 A, published Oct. 11, 2007.

* cited by examiner

*Primary Examiner* — Saeid Ebrahimi Dehkordy
*Assistant Examiner* — Lennin Rodriguezgonzale
(74) *Attorney, Agent, or Firm* — NDQ&M Watchstone LLP

(57) ABSTRACT

An image-forming system comprising an image-forming device and a portable terminal. The image-forming device has a state-detecting part and a panel part that includes a plurality of light-emitting elements, the panel part adapted such that a turned-on/turned-off pattern of the plurality of light-emitting elements is switched, and optical signals destined for the portable terminal and including information on the state of the image-forming device. The portable terminal has an image-capturing part, a storage part for storing an application, a display part for displaying an image and a screen, and a processing part a processing part for identifying, based on the application, the information on the state of the image-forming device included in the optical signals from image data obtained as a result of the image-capturing part capturing an image of the panel part, and for displaying, the state of the image-forming device on the display part.

16 Claims, 10 Drawing Sheets

IMAGE-FORMING SYSTEM, IMAGE-FORMING DEVICE, AND IMAGE-FORMING SYSTEM CONTROL METHOD

This application is based upon and claims the benefit of priority from the corresponding Japanese Patent Application No. 2011-165431 filed on Jul. 28, 2011, the entire contents of which are incorporated herein by reference.

BACKGROUND

1. Field of the Disclosure

This disclosure relates to an image-forming system comprising an image-forming device and a portable terminal, the portable terminal having an image-capturing part and a display part for displaying the results of image capture. The disclosure also relates to an image-forming device and a portable terminal.

2. Description of Related Art

For example, with image-forming devices and the like, there are cases in which a display part that employs a liquid crystal panel is provided so that the user can be informed of the state of the device such as the occurrence of an error. When a liquid crystal panel is used, text, symbols, graphics, or the like may be displayed in order for the user to be informed of the state. On the other hand, there are also cases in which, for example, a product is to be manufactured while minimizing cost in accordance with demands of the consumer, such as in new or developing countries. In order to reduce price by minimizing manufacturing costs even to a small degree, there are cases in which a plurality of LEDs are provided instead of a liquid crystal display in low-cost products, with the state being displayed using the LEDs.

However, manufacturing costs increase as the number of LEDs increases. Thus, LED turned-on/turned-off patterns have been devised in order to communicate a large variety of messages to the user while minimizing the number of LEDs that are installed. Technologies of the type described below have been known whereby a large variety of messages can be communicated using LED turned-on/turned-off patterns. Specifically, a communication device is known that comprises one display element for displaying device warnings, fault detection means for detecting faults according to classifications within the device itself, and a flashing drive control means for driving flashing of the display element using a flashing pattern whereby the number of flashes correlates to the classification of the fault that has been detected by the fault detection means. As a result of this configuration, the attempt is made to display warnings that relate to a number of types of faults.

For example, with image-forming devices that display states using only light-emitting elements such as LEDs without a liquid crystal panel, numerals or text are expressed according to the turned-on/turned-off pattern of a plural number of LEDs. For example, there are cases where error codes having a plural number of digits (e.g., four digits) are expressed by switching the turned-on/turned-off pattern a plural number of times. For example, when there are four LEDs, information can be transmitted as four bits (½ byte) by the turning on and off of the four LEDs one time. For example, when a LED turned-in/turned-off pattern is switched using four repetitions, messages such as two-byte-unit error codes can be displayed by switching the LED turned-on/turned-off pattern. Thus, with image-forming devices that display states using only light-emitting elements such as LEDs, numerals and the like can be expressed by switching the turned-on/turned-off pattern of the plural number of LEDs multiple times, and error information thus can be communicated.

However, the user must identify various turned-on/turned-off patterns of a plural number of LEDs, and interpret the message being relayed by the image-forming device by consulting a manual or other resource. At such a time, the user cannot always accurately interpret the turned-on/turned-off pattern of the LEDs. Consequently, there is the problem that it is difficult to use the device because the messages that are emitted from the image-forming device are difficult to accurately identify.

There are also image-forming devices in which information that represents the state of the image-forming device is transmitted to a computer (e.g., the computer of the user) that can communicate with the image-forming device. In this case, the state of the image-forming device can be identified without the turned-on/turned-off pattern of the LEDs having to be interpreted. However, in order to identify the state of the image-forming device, the user must move to the location of the computer. Problems with ease of use thus remain for the user, even though the state of the image-forming device is displayed on the computer.

With the conventional communication devices described above, a single display element is used, and fault classes are displayed based on flashing repetitions of the single display element. However, when there are a large number of fault classes (e.g., ten to several tens), an extremely large number of flashing repetitions of the display element are needed in order to communicate a single fault, and the operation of counting the large number of flashing repetitions becomes burdensome. In addition, the use of only a single display element is inappropriate for relaying detailed states. Consequently, there have been real practical problems with such communication devices, and it has not been possible to resolve problems related to user inconvenience and ease of use.

SUMMARY

According to the present disclosure, in view of the problems of the prior art as described above, a optical signal that is emitted upon the switching of the turned-on/turned-off pattern of a plurality of light-emitting elements by an image-forming device is identified at a portable terminal having an image-capturing part, and the state of the image-forming device that has been identified is displayed on the display part of the portable terminal, allowing the state of the image-forming device to be accurately and easily confirmed, thereby improving ease of use.

In order to resolve the problems described above, the image-forming system in a first aspect of the disclosure includes an image-forming device and a portable terminal, the image-forming device having a printing engine part, a state-detecting part, and a panel part, and the portable terminal having an image-capturing part, a display part, and a processing part. The printing engine part carries out printing. The state-detecting part detects a state of the image-forming device. The panel part includes a plurality of light-emitting elements for displaying the state of the image-forming device, the panel part adapted such that, while the state of the image-forming device is being displayed to a user by the light-emitting elements, a turned-on/turned-off pattern of the plurality of light-emitting elements is switched, and optical signals destined for a portable terminal and including information on the state of the image-forming device are transmitted. The storage part stores an application. The display part displays an image and a screen. The processing part identifies based on the application, the information on the state of the image-forming device included in the optical signals from image data obtained as a result of the image-capturing part capturing an image of the panel part, and for displaying, based on the application, the state of the image-forming device on the display part.

Further features and advantages of the present disclosure will become apparent from the description of embodiments given below.

DETAILED DESCRIPTION

Embodiments of the disclosure are described below with reference to FIGS. 1 to 12. This description will be made using, as an example, an image-forming system 100 that comprises a printer 1 (corresponding to the image-forming device) and a portable terminal 2. However, the following is only a descriptive example; elements related to configuration, disposition, and the like, that are described in the embodiments do not limit the scope of the disclosure.

(General Configuration of Image-Forming System 100)

Figure 1:
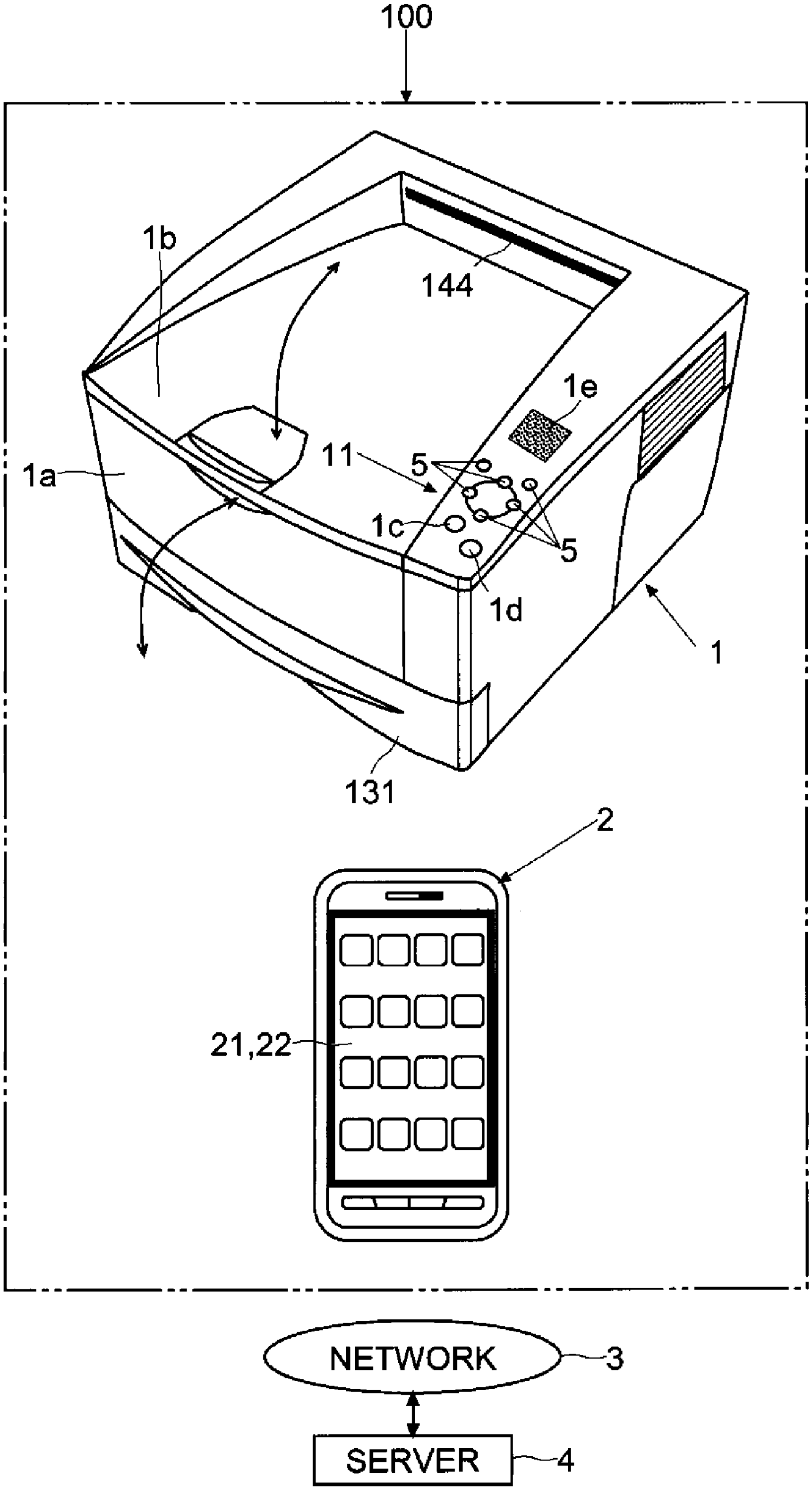
FIG. 1 is a descriptive diagram representing an example of the image-forming system.

An example of the general configuration of the image-forming system 100 pertaining to this embodiment is first described with reference to FIG. 1. FIG. 1 is a descriptive diagram representing an example of the image-forming system 100.

The description will begin from the printer 1. The printer 1 of this embodiment receives printing data from a computer 200 or the like and carries out printing. The used printing paper is discharged onto a discharge tray on the top surface of the printer 1 (upper surface cover 1*b*).

With the printer 1 of this embodiment, when there is a paper jam (paper clogging), the front cover 1*a* can be opened and closed in order to free the paper (the opening and closing directions are shown in FIG. 1 by solid arrows). In addition, as indicated by the solid arrows in FIG. 1, the discharge tray (a portion of the upper surface cover 1*b*) can also be opened and closed to allow replacement of a container 6 for replenishing toner or for maintenance.

A panel part 11 for displaying the state of the printer 1 is provided on the right side of the upper part of the printer 1. According to the printer 1 of this embodiment, six LEDs 5 (LEDs 51 to 56 corresponding to the light-emitting element (refer to FIG. 6)) are provided on the panel part 11. The state display by the LEDs 51 to 56 is described in detail below. As part of the panel part 11, for example, an online key 1*c* is provided for switching the printer 1 between an online state (printing-enabled state) and an offline state (printing-disabled state), and a cancel key 1*d* is provided for enacting a command for canceling a printing job or the like. In this description, an example is described in which two keys are provided, but three or more keys may be provided.

The portable terminal 2 will be described below. As shown in FIG. 1, the portable terminal 2 of this embodiment is what is known as a "smartphone." As shown in FIG. 1, the portable terminal 2 includes a display part 21. For example, the display part 21 is a liquid crystal panel. An icon for an application 7 (refer to FIG. 4) used on the portable terminal 2 can be displayed on a standby screen on the display part 21. In addition, the portable terminal 2 has a touch panel part 22 (e.g., an electrostatic capacity type panel). The user can perform various operations by touching the display part 21 of the portable terminal 2. For example, the application 7 can be launched by touching an icon. Although not shown in FIG. 1, an image-capturing part 26 (camera) is provided on the back surface of the portable terminal 2.

The portable terminal 2 is enabled for calling over a cellular telephone network. At the portable terminal 2, a computer such as a server 4 is accessed via a network 3, and data or an application 7 for the portable terminal 2 can be downloaded.

The code 1*e* (corresponding to the code display) is affixed as a seal to the main case of the printer 1 towards the middle of the panel part 11 of the printer 1. The code 1*e* includes information concerning the address where the application 7 for the printer 1 can be downloaded. For example, the code 1*e* is a bar code or QR code. When a user captures the code 1*e* using the image-capturing part 26 (camera) of the portable terminal 2, the portable terminal 2 accesses the download site for the application 7 for the printer 1. As a result, the user can easily download the application 7 for the printer 1 simply by capturing an image of the code 1*e*.

The image-forming device (e.g., the printer 1) has a code display (code 1*e*) that includes information concerning the site for downloading the application 7 corresponding to the model of the image-forming device, and the portable terminal 2 has a communication part (wireless communication part 29) for communicating externally. The processing part (portable control part 20) of the portable terminal 2 identifies the site for downloading the application 7 based on the image data that was captured when the code display was captured by the image-capturing part 26. The communication part (wireless communication part 29) of the portable terminal 2 then acquires the application 7 corresponding to the image-forming device from the download site that has been identified. As a result, the application 7 corresponding to the model and type of the image-forming device (e.g., the printer 1) can be downloaded at the portable terminal 2 without complicated processes or operations. Consequently, the state of the image-forming device (e.g., the printer 1) having the image-capturing part 26 can be readily identified by the portable terminal 2.

(Configuration of Image-Forming Device)

Figure 2:
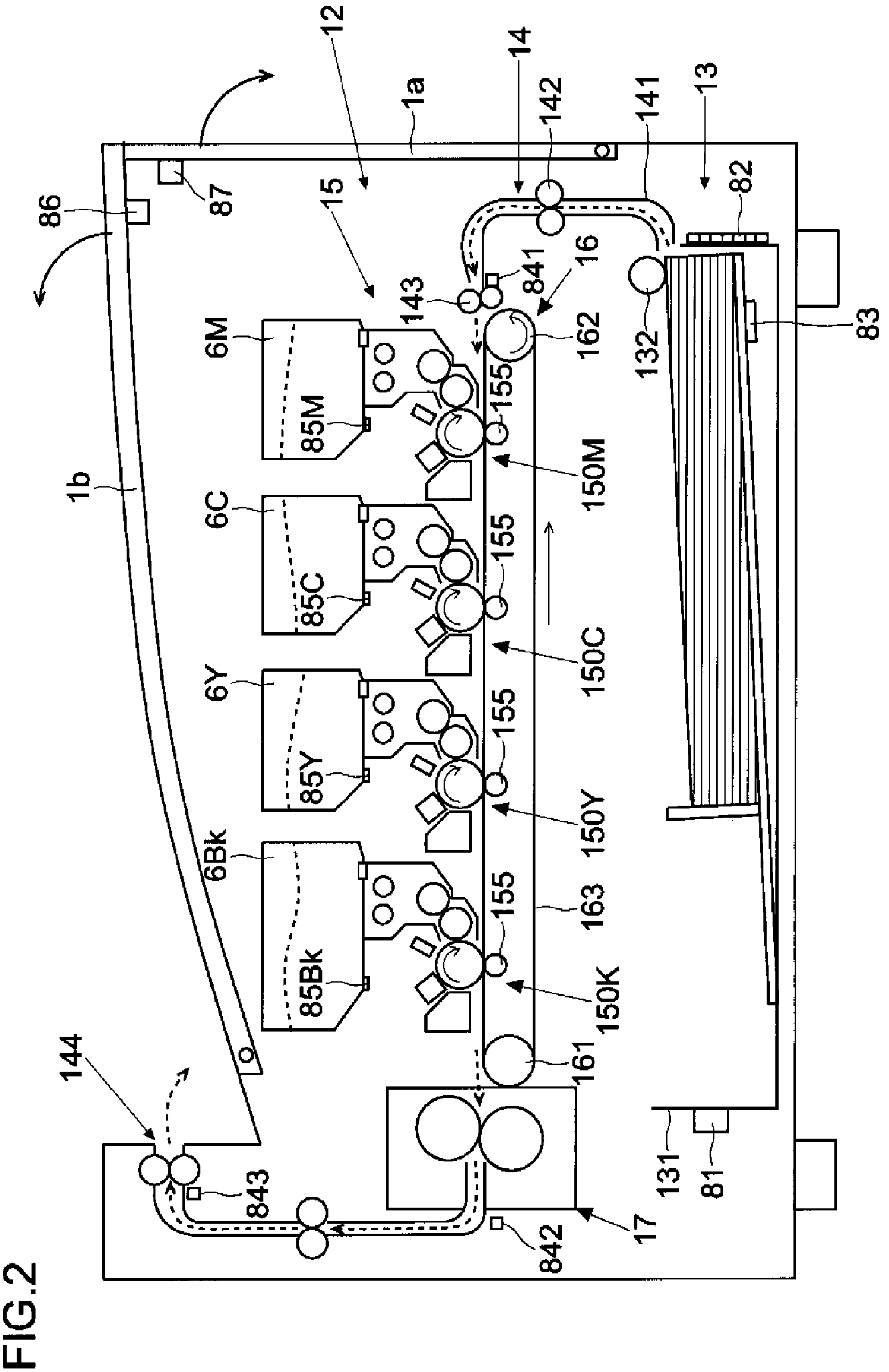
FIG. 2 is a schematic left-side sectional view of an example of the printer.
Figure 3:
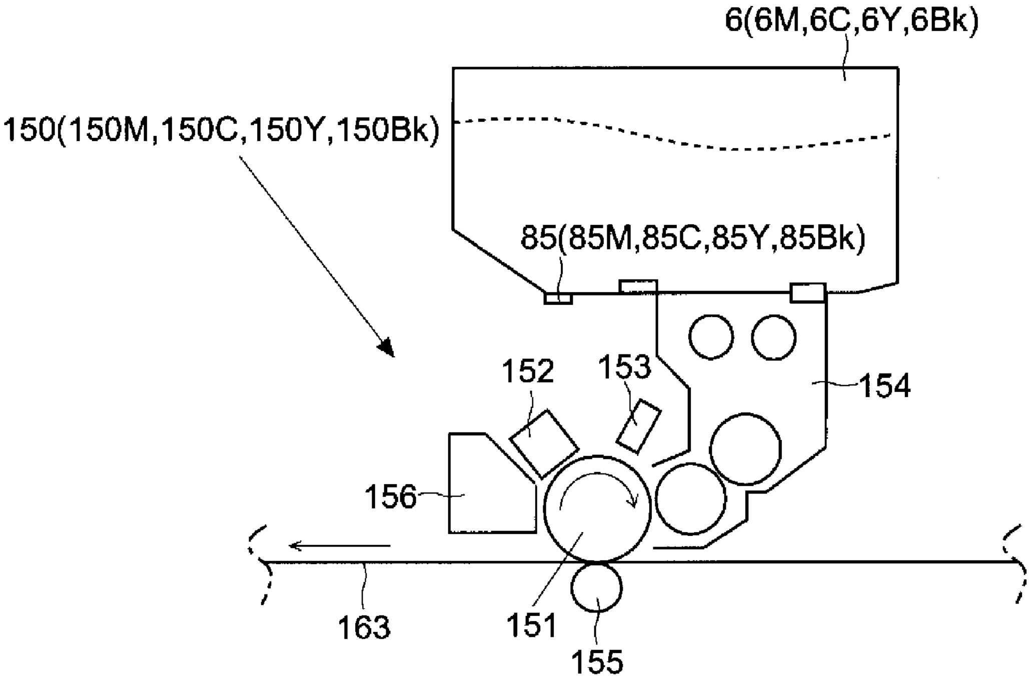
FIG. 3 is a schematic expanded sectional view of an example of the image-forming unit.

Next, the general configuration of the printer 1 of this embodiment will be described with reference to FIGS. 2 and 3. FIG. 2 is a schematic left-side sectional view showing an example of the printer 1. FIG. 3 is a schematic enlarged sectional view showing an example of the image-forming unit 150.

As shown in FIG. 2, a paper feed part 13, a transport path 14, an image-forming part 15, a conveyor belt unit 16, and a fixing part 17 are provided as the printing engine part 12 that carries out printing (refer to FIG. 4) in the printer 1.

The paper feed part 13 of the lowermost part of the printer 1 comprises a supply cassette 131 in which various types of paper of various sizes (e.g., standard paper, recycled paper, letter paper, OHP slides, and the like) are stacked. The cassette 131 can be removed in order to replenish the paper. The paper feed part 13 has a paper feed roll 132 that rotates to feed the paper to the transport path 14 one sheet at a time (the paper feed direction is indicated in the drawings by a broken arrow).

The paper is guided by a guide plate 141 that is provided on the transport path 14 and is transported by a transport roll pair 142 to a pair of resist rollers 143 upstream in the paper feed direction from a transport belt 163. Next, the pair of resist rollers 143 feed the paper to a conveyor belt unit 16 in timing with transfer of a toner image that has been formed by an image-forming part 15.

The conveyor belt unit 16 comprises a driver roller 161, a driven roller 162, and the endless conveyor belt 163 stretched over the rollers. In addition, the conveyor belt 163 is sandwiched by a photosensitive drum 151 and a transfer roller 155, which are described below. As a result, a nip is formed between the photosensitive drum 151 and the conveyor belt 163. The paper that is fed from the pair of resist rollers 143 advances and is transported to the nip.

The image-forming part 15 comprises image-forming units 150. The image-forming units 150 will be described with reference to FIGS. 2 and 3. The printer 1 has an image forming unit 150M (magenta), an image-forming unit 150C (cyan), an image-forming unit 150Y (yellow), and an image-forming unit 150Bk (black) aligned in the stated order from the upstream side in the direction of paper transport (the direction of paper transport being indicated by the broken arrow in FIG. 2). These image-forming units 150M, 150C, 150Y, and 150Bk form the toner images of the respective colors. Although the image-forming units 150M to 150Bk form different toner image colors, because their configurations are similar, hereafter the letters, M, C, Y, and Bk are omitted, except when the specific descriptions are to be made.

The image-forming units 150 comprise the photosensitive drum 151, a charging device 152, an exposure device 153, a developing device 154, the transfer roller 155, and a cleaning device 156. The respective photosensitive drums 151 that are used as image support bodies are disposed at substantially the center of the image-forming unit 150 and are rotatably driven. The charging device 152 charges the photosensitive drum 151 to a predetermined potential using a wire, roller, brush, or the like. The exposure device 153 performs irradiation with light in accordance with the image data, thereby exposing the respective photosensitive drums 151 and forming electrostatic latent images on the photosensitive drums 151. In addition, the developing device 154 supplies toner to the photosensitive drum 151, whereby the electrostatic latent image is developed using the toner. The transfer roller 155 is disposed opposite the respective photosensitive drums 151 from below. During printing, a predetermined voltage is applied to the transfer roller 155, thereby causing transfer of the toner image to the paper. The respective image-forming units 150 form toner images, and the toner images are precisely transferred onto the paper while being superimposed. Respective cleaning devices 156 use a blade, roll, or the like to remove the toner and the like that remains on the photosensitive drums 151 after transfer.

As shown in FIG. 2 and FIG. 3, a container 6 that houses toner is connected to the developing device 154 of each of the image forming units 150. Toners of the corresponding color are housed in respective containers 6, and the corresponding developing devices 154 are replenished with toner therefrom. Specifically, magenta toner is housed in the container 6M, cyan toner is housed in the container 6C, yellow toner is housed in the container 6Y, and black toner is housed in the container 6Bk. The respective containers 6 are detachable in order to allow replacement when empty.

The paper on which the toner images have been transferred is conveyed from the conveyor belt 163 to the fixing part 17. While passing through the fixing part 17, the paper is heated and compressed, thereby fixing the toner image to the paper. Subsequently, the paper is discharged from a paper discharge opening 144 to a discharge tray (upper surface cover 1*b*). Image formation is thereby completed.

(Hardware Configuration of the Image-Forming System 100)

Figure 4:
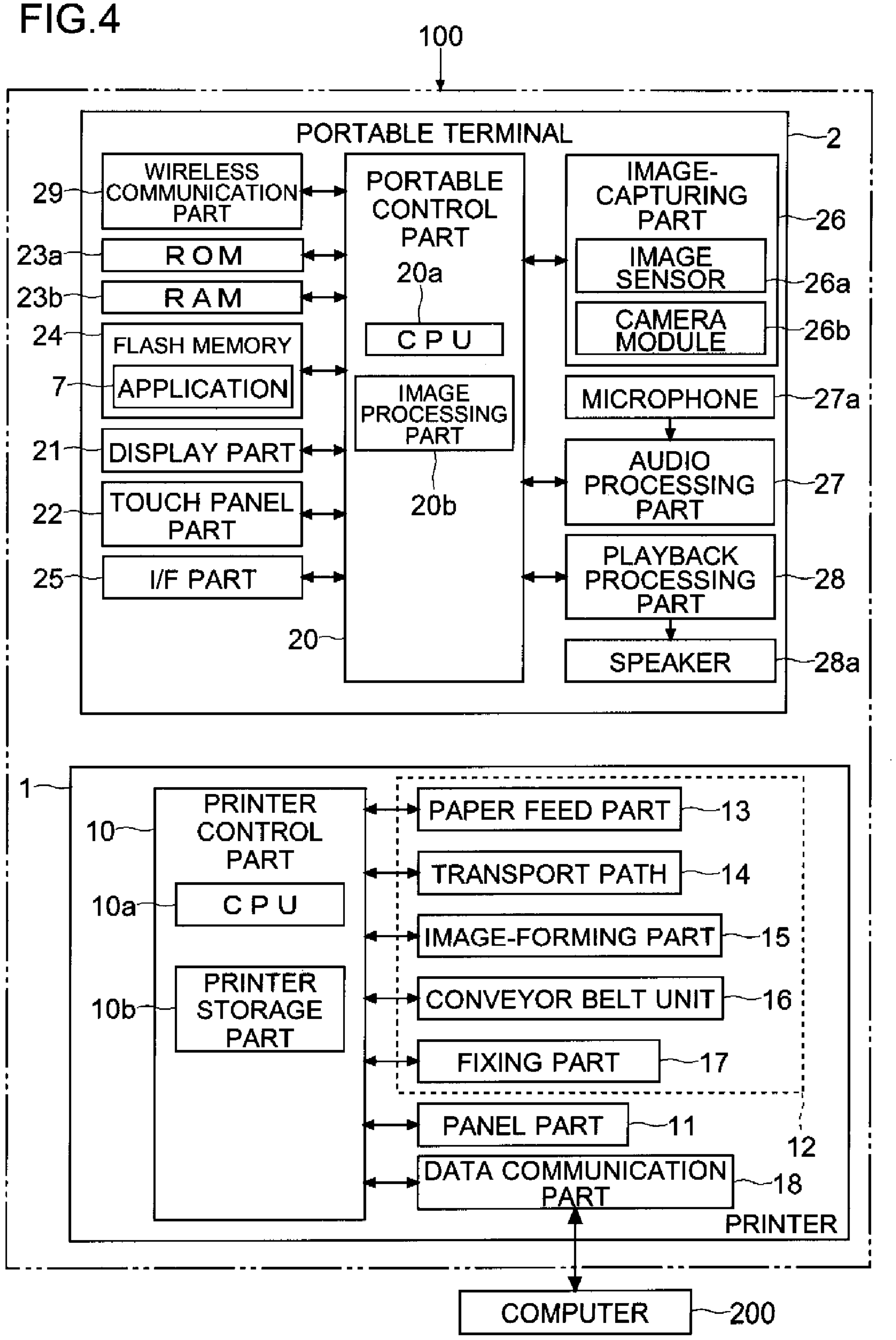
FIG. 4 is a block diagram showing an example of the hardware of the image-forming system.

An example of the hardware configuration of the image-forming system 100 pertaining to this embodiment is described below with reference to FIG. 4. FIG. 4 is a block diagram showing an example of the hardware of the image-forming system 100.

The description starts from the printer 1. A printer control part 10 is provided in the printer 1. The printer control part 10 conducts operational control of the printer 1. For example, the printer control part 10 comprises a CPU 10*a*, and a printer storage part 10*b*. The CPU 10*a* controls various parts of the printer 1 based on control data and the control program that is housed in the printer storage part 10*b* and has been launched. The printer storage part 10*b* is a combination of volatile storage devices and nonvolatile storage devices such as ROM and RAM. The printer storage part 10*b* can store various types of data, such as control programs for the printer 1, control data, setting data, and image data. The printer control part 10 controls operations by using communication lines, a bus, or the like to connect with the various parts such as the paper feed part 13, the transport path 14, the image-forming part 15, the conveyor belt unit 16, the fixing part 17, and the panel part 11.

The printer control part 10 is connected with a data communication part 18 that has various connectors, sockets, and the like, thereby allowing communication. The data communication part 18 receives printing data that contains image data, destination information, and information representing settings for printing from a plurality of computers 200 on the network 3 or the like (e.g., PCs or servers; for convenience, only one is shown in FIG. 3). The printer control part 10 then carries out printing while controlling the image-forming part 15 and the like based on the printing data that has been sent from the computer 200.

The portable terminal 2 will be described next. The portable terminal 2 comprises the portable control part 20 (corresponding to the processing part), a ROM 23*a*, a RAM 23*b*, a flash memory 24 (corresponding to the storage part), the display part 21, the touch panel part 22, an I/F part 25, an image-capturing part 26, an audio processing part 27, a microphone 27*a*, a playback processing part 28, a speaker

28*a*, and a wireless communication part 29 (corresponding to the communication part), and the like.

The portable control part 20 is the part that controls operation of the portable terminal 2. For example, the portable control part 20 comprises a CPU 20*a* or an image processing part 20*b*. The CPU 20*a* controls operation of the portable terminal 2 based on the OS of the portable terminal 2 or the application 7. The image processing part 20*b* carries out image processing on various types of image data. For example, the image processing part 20*b* carries out image processing on image data that is obtained by image capture by the image-capturing part 26 and displays [the results] on the display part 21.

The ROM 23*a* and the flash memory 24 store control data and control programs for the portable terminal 2. The portable control part 20 controls the various parts of the portable terminal 2 in accordance with the application 7, the control data, or the control program that is stored in the flash memory 24 or the ROM 23*a*. In addition, a downloaded application 7 can be stored in the flash memory 24 (although multiple applications 7 can be stored, only one is shown in FIG. 4 for purposes of simplification). In accordance with a launch command for the application 7 made by the user through the touch panel part 22, the portable control part 20 reads the application 7 or the program from the flash memory 24 into the RAM 23*b* and executes [the application or program].

Various types of information are displayed on the display part 21 as a result of a request from the portable control part 20. The touch panel part 22 is connected with the portable control part 20. The portable control part 20 identifies the touched location based on the output of the touch panel part 22. Next, the portable control part 20 identifies the touched object among the icons, buttons, and keys that are displayed on the display part 21. For example, by touching the display location for an icon, button, key, or the like, the desired application 7 is launched, or a telephone call can be made.

Communication chips, sockets, or connectors based on various standards are mounted on the I/F part 25. The I/F part 25 reads data or programs that are stored on a storage medium (e.g., a memory card) that has been inserted into the I/F part 25 or writes data to the recording medium.

The image-capturing part 26 is a camera that is provided in the portable terminal 2. The image-capturing part 26 comprises, in addition to a lens, an image sensor 26*a*, or a camera module 26*b* that contains an analog front end (AFE) for generating digital image data by processing an analog signal that is outputted by the image sensor 26*a*, or a digital signal processor that processes digital image data (signals) that have been generated by the AFE. The image data that has been obtained by image-capturing performed by the image-capturing part 26 is transmitted to the portable control part 20.

The wireless communication part 29 comprises an antenna or communication circuit. The wireless communication part 29 accesses a cellular telephone network in accordance with a command from the portable control part 20. For example, downloading of the application 7 from a server 4 or transmission and receiving of data with respect to a device outside the system can be carried out via the wireless communication part 29. The wireless communication part 29 carries out transmission and receiving of audio data, allowing communication with the telephone of a counterpart.

The audio processing part 27 carries out signal processing on the audio that has been input from the microphone 27*a* to produce a format that can be sent from the wireless communication part 29. The playback processing part 28 uses the speaker to play back audio data from the counterpart that has been received by the wireless communication part 29.

(State Detection on the Image-Forming Device)

Figure 5:
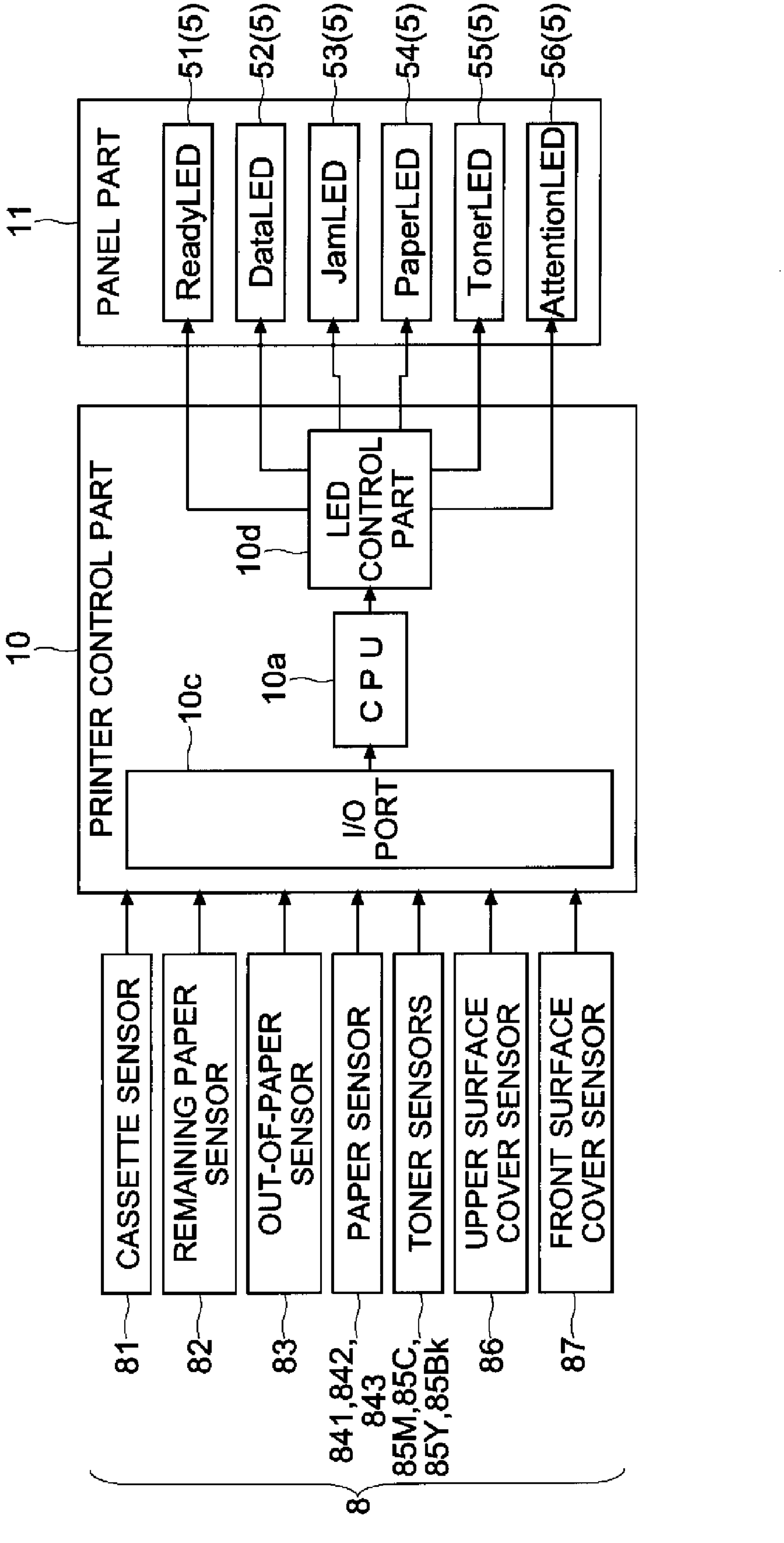
FIG. 5 is a block diagram for describing state detection with the printer.

An example of state detection on the printer 1 pertaining to this embodiment is described below with reference to FIGS. 2 and 5. FIG. 5 is a block diagram for describing state detection on the printer 1.

A plurality of sensors are provided in the printer 1 of this embodiment as the state-detecting parts 8 for detecting the state of the printer 1. Examples of the sensors (state-detecting parts 8) for state detection that are provided in the printer 1 include a cassette sensor 81, a remaining paper sensor 82, a out-of-paper sensor 83, paper sensors 841 to 843, toner sensors 85M to 85Bk, an upper surface cover sensor 86, and a front surface cover sensor 87, and the like (refer to FIG. 2).

The cassette sensor 81 is a sensor for detecting whether the cassette 131 of the paper feed part 13 has been removed. The cassette sensor 81 changes output when the cassette 131 has been installed or removed. For example, the cassette sensor 81 is an interlock switch that is in contact with the cassette 131 (refer to FIG. 2). However, the cassette sensor 81 may also be a photosensor, provided that it can detect whether or not the cassette 131 has been removed. The output of the cassette sensor 81 is transmitted to the CPU 10*a* via the I/O port 10*c* of the printer control part 10. As a result, the CPU 10*a* can identify whether or not the cassette 131 has been removed.

The remaining paper sensor 82 is a sensor for detecting the amount of paper remaining in the cassette 131. For example, the remaining paper sensor 82 detects the position of the carriage plate on which the paper is carried. For example, the remaining paper sensor 82 comprises a plurality of reflectance type photosensors that are provided below the paper feed roll 132 (refer to FIG. 2). The positions of the photosensors that can receive reflected light will be different depending on the position of the carriage plate. However, other sensors may be used for remaining paper sensor 82, provided that the amount of remaining paper can be detected. The output of each sensor of the remaining paper sensor 82 is transmitted to the CPU 10*a* via the I/O port 10*c* of the printer control part 10. As a result, the CPU 10*a* can identify the discrete amount of remaining paper.

The out-of-paper sensor 83 is a sensor for detecting the presence of paper in the cassette 131 of the paper feed part 13. The output of the out-of-paper sensor 83 changes depending on whether any paper remains. For example, the out-of-paper sensor 83 is a reflectance type photosensor that emits light towards the paper from a hole that is provided in the carriage plate (refer to FIG. 2). However, running out of paper can be detected by other systems, provided that the presence or absence of paper is detected. The output of the out-of-paper sensor 83 is transmitted to the CPU 10*a* via the I/O port 10*c* of the printer control part 10. As a result the CPU 10*a* can identify the presence or absence of paper.

The paper sensors 841 to 843 are sensors for detecting the transport state of the paper. For example, the paper sensors 841 to 843 detect the arrival and passage of paper. For example, the paper sensors 841 to 843 are transmissive type photosensors. However, other sensors may be used for the paper sensors 841 to 843, provided that the presence (arrival, passage) of paper can be detected. For example, a plural number of paper sensors 841 to 843 can be provided along the paper transport path. For example, the paper sensor 841 is provided in advance of the pair of resist rollers 143, the paper sensor 842 is provided at the outlet position of the fixing part 17, and the paper sensor 843 is provided at the paper discharge opening 144 (refer to FIG. 2). The outputs of the paper sensors 841 to 843 are transmitted to the CPU 10*a* via the I/O port 10*c* of the printer control part 10. The CPU 10*a* identifies the occurrence of a paper jam when the arrival of fed paper does not occur within the expected time period for detection of paper arrival, or when passage of the paper does not occur within the expected time period for detection of paper passage.

The toner sensors 85M to 85Bk are sensors for detecting the remaining amount of toner in the respective containers 6. A single toner sensor is provided for each of the containers 6 (refer to FIG. 2). The output of each of the toner sensors is transmitted to the CPU 10*a* via the I/O port 10*c* of the printer control part 10. As a result, the CPU 10*a* identifies the amount of remaining toner in the containers 6.

The upper surface cover sensor 86 is a sensor for detecting the opened or closed state of the upper surface cover 1*b*. The upper surface cover sensor 86 changes its output when the upper surface cover 1*b* is open or closed. For example, the upper surface cover sensor 86 is an interlock switch that is in contact with the upper surface cover 1*b* when the upper surface cover 1*b* is closed (refer to FIG. 2). However, the upper surface cover sensor 86 may be a photosensor or the like, provided that it can detect opening or closing of the upper surface cover 1*b*. The output of the upper surface cover sensor 86 is transmitted to the CPU 10*a* via the I/O port 10*c* of the printer control part 10. As a result, the CPU 10*a* can identify whether the upper surface cover 1*b* is open or closed.

The front surface cover sensor 87 is a sensor for detecting the open or closed state of the front surface cover 1*a*. The front surface cover sensor 87 changes its output when the front surface cover 1*a* is open or closed. For example, the front surface cover sensor 87 is an interlock switch that is in contact with the front surface cover 1*a* when the front surface cover 1*a* is closed (refer to FIG. 2). However, the front surface cover sensor 87 may be a photosensor or the like, provided that it can detect opening or closing of the front surface cover 1*a*. The output of the front surface cover sensor 87 is transmitted to the CPU 10*a* via the I/O port 10*c* of the printer control part 10. As a result, the CPU 10*a* can identify whether the front surface cover 1*a* is open or closed.

(State Display on the Panel Part 11)

Figure 6:
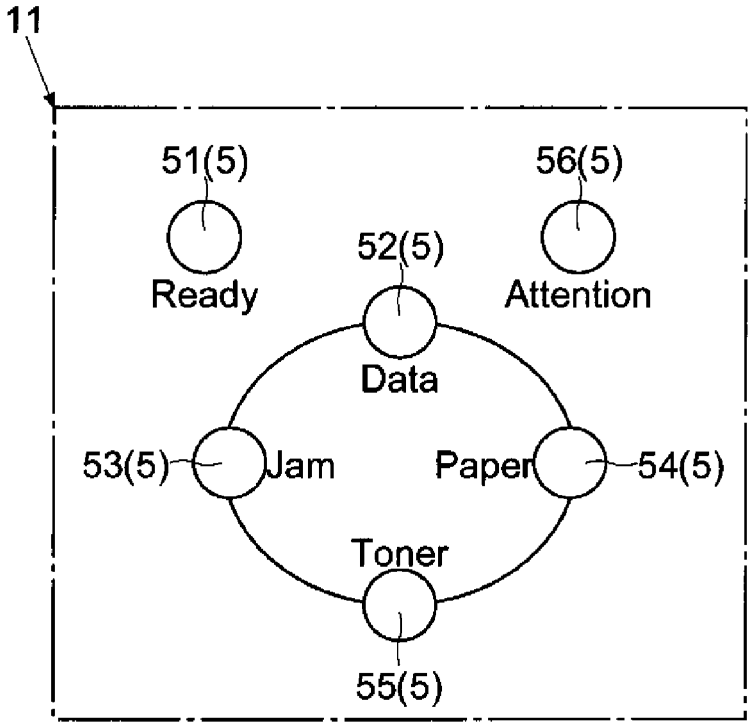
FIG. 6 is an enlarged descriptive diagram of the portion of the panel part where the LEDs are installed.

An example of state display on the image-forming device (printer 1) pertaining to this embodiment is described below with reference to FIGS. 5 and 6. FIG. 6 is a descriptive diagram in which the portion of the panel part 11 in which the LEDs 5 are disposed is enlarged.

As shown in FIGS. 5 and 6, a plurality of LEDs 5 (light-emitting elements) for displaying the state of the printer 1 are provided on the panel part 11 of the printer 1 of this embodiment. With the printer 1 of this embodiment, a total of 6 LEDs are provided: a Ready LED 51 (light-emitting element, corresponding to the reference light-emitting element), a Data LED 52 (corresponding to the light-emitting element), a JAM LED 53 (corresponding to the light-emitting element), a Paper LED 54 (corresponding to the light-emitting element), a Toner LED 55 (corresponding to the light-emitting element), and an Attention LED 56 (corresponding to the light-emitting element). The number of LEDs 5 that are provided may be five or fewer, or seven or more.

The printer control part 10 controls the turning on and off of each of the LEDs 51 to 56. The CPU 10*a* of the printer control part 10 identifies the state of the printer 1 based on the output of the various sensors (state-detecting parts 8). The CPU 10*a*, in accordance with the state of the printer 1, instructs the LED control part 10*d* to turn the LEDs 5 on or off. The LED control part 10*d* is a circuit that controls the actual turning on an off of the LEDs 51 to 56. Based on instructions from the CPU 10*a*, the LED control part 10*d* supplies current to the LEDs 5 that are to be illuminated but does not supply current to the LEDs 5 that are not to be illuminated.

When the online key 1*c* is pressed in an off-line state, thereby placing the printer 1 in an online state, the printer control part 10 turns on the Ready LED 51. When the online key 1*c* is pressed in an online state, thereby placing the printer 1 in an offline state, then the printer control part 10 turns off the Ready LED 51.

When printing data is being received from the computer 200 by the data communication part 18, the printer control part 10 turns on (or turns off) the Data LED 52. On the other hand, the Data LED 52 is turned off when the printer control part 10 is not receiving printing data from the computer 200.

When a jam is detected based on the outputs of the paper sensors 841 to 843, the printer control part 10 turns on the JAM LED 53. On the other hand, the printer control part 10 turns off the JAM LED 53 in a state in which a jam is not detected.

When a paper empty error is detected based on the output of the out-of-paper sensor 83, then the printer control part 10 turns on the Paper LED 54. On the other hand, the printer control part 10 turns off the Paper LED 54 when the presence of paper is detected.

Based on the output of the toner sensors 85M to 85Bk, when a toner empty error is detected at any of the containers 6, the printer control part 10 turns on the Toner LED 55. On the other hand, the printer control part 10 turns off the Toner LED 55 if a toner empty [error] is not detected.

The printer control part 10 turns on the Attention LED 56 when the cassette 131 is detected as being removed based on the output of the cassette sensor 81, when the upper surface cover 1*b* is detected as being open based on the output of the upper surface cover sensor 86, when the front surface cover 1*a* is detected as being open based on the output of the front surface cover sensor 87, or otherwise when a warning is sent to the user. On the other hand, if a state that demands a warning is not detected, then the printer control part 10 turns off the Attention LED 56.

(Communication Display by the Panel Part 11 and State Display by the Portable Terminal 2)

Figure 7:
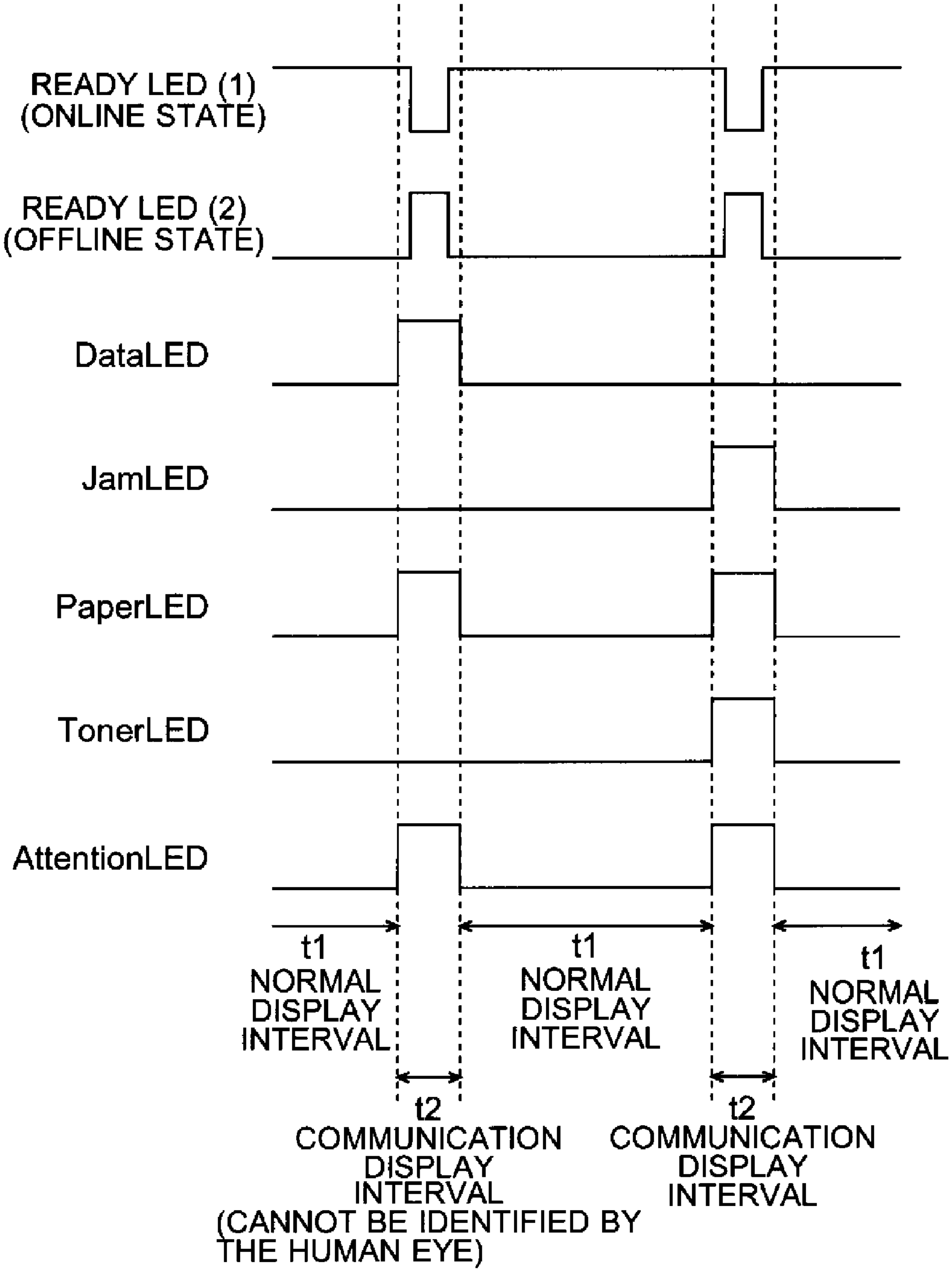
FIG. 7 is a timing chart showing an example of communication display towards the portable terminal using the LEDs of the panel part.

An example of communication display to the portable terminal 2 using the LEDs 51 to 56 of the panel part 11 of this embodiment is described below with reference to FIG. 7. FIG. 7 is a timing chart showing an example of communication display to the portable terminal 2 using the LEDs 51 to 56 of the panel part 11.

The panel part 11 of the printer 1 of this embodiment generates an optical signal that represents the state of the printer 1 (performs a communication display) to the portable terminal 2 using the LEDs 51 to 56 during normal state display of the printer 1 to the user. With this optical signal, the printer control part 10 switches the turned-on/turned-off pattern of the LEDs 51 to 56, thereby including state information concerning the printer 1 in the optical signal. In other words, the panel part 11 transmits a coded turned-on/turned-off pattern using the LEDs 51 to 56.

As shown in FIG. 7, the printer control part 10 divides the display of state to the user using the LEDs 51 to 56 into fixed intervals (normal display interval t1 in FIG. 7). Next, an interval in which the communication display to the portable terminal 2 occurs (communication display interval t2 in FIG. 7) is provided in between a normal display interval t1 and a normal display interval t1.

Thus, the panel part 11 of the printer 1 of this embodiment switches between normal display (display for the user) and communication display (display for the portable terminal 2)

using time division. In other words, the panel part 11 carries out the normal state display to the user for a predetermined time period. Once the communication display to the portable terminal 2 has been carried out, then the panel part 11 again carries out normal state display towards the user.

The length of the communication display interval t2 during which communication display involving generation of a optical signal to the portable terminal 2 is carried out need only be captured by the portable terminal 2 and thus may be too fast for the human eye. In other words, when the panel part 11 generates an optical signal by the turning on of the light-emitting elements (LEDs 51 to 56) for the length of the communication display interval t2 during which communication display involving generation of an optical signal is carried out (when the light-emitting elements are illuminated), the LEDs 51 to 56 (light-emitting elements) may be turned on or off for a duration that cannot be seen by the human eye (e.g., substantially 1/30 to 1/60 sec, where the capture period of the image-capturing part 26 of the portable terminal 2 is longer than the communication display interval t2). As a result, there will be no incidence of the LEDs 51 to 56 of the panel part 11 anomalously turning on or off, and no erroneous identification that a failure has occurred.

The length of the normal display interval t1 and the communication display interval t2 may be set by the computer 200 that is connected to the printer 1. For example, setting of the length of the normal display interval t1 and the communication display interval t2 is made on the printer driver software that is installed on the computer 200, and the details of the settings are sent to the printer 1. As a result, the printer control part 10 will switch between state display and communication display in accordance with settings made by the user.

By capturing the image of the panel part 11 using a smartphone or other portable terminal 2, the optical signals that are generated by the panel part 11 during the communication display interval t2 are received and identified by the user on the portable terminal 2. To this end, the flash memory 24 of the portable terminal 2 of this embodiment stores an application 7 whereby the information that has been included in the optical signal that has been generated by the printer 1 and received by the image-capturing part 26 is identified by the portable control part 20, and whereby the information concerning the printer 1 is displayed on the display part 21 of the portable terminal 2 based on the identified information.

When an application 7 for identifying the information contained in the optical signals or for performing another action is launched as a result of a touch performed by the user, the portable control part 20 acquires information on the state of the printer 1 that is contained in the optical signal that has been transmitted from the panel part 11 using the image-capturing part 26. The application 7 contains a communication standard (protocol) in accordance with optical signals between the panel part 11 and the portable terminal 2 so that the content signifying the turned-on/turned-off pattern of the LEDs 51 to 56 is identified. Thus, the portable control part 20 identifies information on the state of the printer 1 that is contained in the optical signal. In addition, the printer control part 10 causes the LEDs 51 to 56 to turn on or off during the communication display interval t2 based on the communication standard.

At this point, in order that the timing of the optical signals that have been generated by the panel part 11 for the portable terminal 2 can be identified at the portable terminal 2, the printer control part 10 of the image-forming system 100 of this embodiment informs the portable terminal 2 that the state has changed from the normal display interval t1 to the communication display interval t2 by switching the light-emission state of the Ready LED 51. Switching of the emitting state of the Ready LED 51 (on→off, off→on) is identified by the portable control part 20 based on the image data that has been captured by the image-capturing part 26. It is thus identified whether or not the panel part 11 is generating an optical signal for the portable terminal 2. The LED 5 that serves as a reference for notifying the portable terminal 2 of the communication display interval t2 may be one of the LEDs 5 other than the Ready LED 51.

Normally, the Ready LED 51 is maintained in an illuminated state. When the printer control part 10 assumes a communication state in which an optical signal is emitted to the portable terminal 2 (during the communication display interval t2), the Ready LED 51 is temporarily turned off (refer to the timing chart for the Ready LED (1) in FIG. 7). As shown in FIG. 7, during the interval in which the Ready LED 51 is turned off, the printer control part 10 transmits information to the portable terminal 2, and the remaining five LEDs 52 to 56 are thereby switched to a turned-on/turned-off pattern. As a result, encoded information is generated by the five LEDs 52 to 56.

As shown in FIG. 7, in the communication display interval t2 of this embodiment, the printer control part 10 switches the five LEDs 52 to 56 (Data LED 52, JAM LED 53, Paper LED 54, Toner LED 55, Attention LED 56) between the normal display interval t1 and a turned-on/turned-off pattern in accordance with the state information of the printer 1. Next, using a coded turned-on/turned-off pattern of the five LEDs 52 to 56, the printer control part 10 causes the panel part 11 to transmit, to the portable terminal 2, an optical signal that contains information showing the state of the printer 1.

Thus, when the Ready LED 51 is maintained in an on state during the normal display interval t1, the portable control part 20 identifies the information contained in the optical signal based on the standard and the turned-on/turned-off pattern of the LEDs 51 to 56 when the Ready LED 51 is turned off in the image data that has been captured by the capture part 26, and the state of the printer 1 is thereby identified. Next, the portable control part 20 causes the information representing the identified state of the printer 1 to be displayed on the display part 21. As a result, detailed information concerning the state of the printer 1 can be confirmed by the user using the portable terminal 2.

In some cases, the Ready LED 51 is maintained in an off state during the normal display interval t1. The portable control part 20 identifies whether the Ready LED 51 is maintained in an on state or whether it is maintained in an off state during the normal display interval t1. The image-capturing part 26 outputs the image data obtained by image-capturing to the portable control part 20 in a period that is set based on specifications (frame rate). Thus, the normal display interval t1 is longer than the communication display interval t2. The portable control part 20 can identify whether the Ready LED 51 is maintained in an on state or is maintained in an off state during the normal display interval t1 based on the pixel value of the pixel at which the Ready LED 51 is positioned.

When the Ready LED 51 is maintained in an off state, the Ready LED 51 is temporarily turned on (refer to the timing chart for the Ready LED (2) in FIG. 7) when the printer control part 10 assumes a communication state in which an optical signal is generated for the portable terminal 2 (during the communication display interval t2). In addition, as shown in FIG. 7, the printer control part 10 transmits the state information concerning the printer 1 to the portable terminal 2 during the interval when the Ready LED 51 is on, and information is thereby sent by switching the turned-on/turned-off pattern of the five LEDs 52 to 56.

When it is identified that the Ready LED 51 is maintained in an off state during the normal display interval t1, the portable control part 20 identifies information contained in the optical signal based on the standard and the turned-on/turned-off pattern of the LEDs 51 to 56 when the Ready LED 51 is on in the image data that has been captured by the image-capturing part 26, thereby identifying the state of the printer 1.

Thus, with the panel part 11 of the image-forming system 100, any of the light-emitting elements among the plurality of light-emitting elements (LEDs 51 to 56) is used as the reference light-emitting element (e.g., the Ready LED 51) for relaying to the portable terminal 2 that an optical signal is being transmitted. Thus, the panel part 11 turns the reference light-emitting element on or off during transmission of the optical signal, and the processing part of the portable terminal 2 (portable control part 20) identifies the state information contained in the optical signal from the image data that is obtained by image capture by the image-capturing part 26 during optical signal transmission with the reference light-emitting element in an on or off state. Due thereto, the times at which the transmission of the optical signal (emission of light) from the panel part 11 starts and ends can be indicated to the portable terminal 2 by the reference light-emitting element. The processing part of the portable terminal 2 thus can accurately identify the information that is contained in the optical signal.

The timing chart of FIG. 7 shows an example in which the printer control part 10 displays the turned-on/turned-off pattern of the five LEDs 52 to 56 as a single pattern during the communication display interval t2. However, the printer control part 10 can switch the turned-on/turned-off pattern of the five LEDs 52 to 56 multiple times during the communication display interval t2 within a period that does not exceed the period (frame rate) in which the image data is output by the image-capturing part 26 of the portable terminal 2. As a result, the amount of information that is sent in a single communication display interval t2 can be increased.

It is impossible to identify, from the printer 1, when the panel part 11 starts to be image-captured by the portable terminal 2. Thus, the printer control part 10 periodically displays on the LEDs 51 to 56 a predetermined turned-on/turned-off pattern representing a starting point for the optical signal that contains the state of the printer 1. The turned-on/turned-off pattern representing the start of the optical signal to the portable terminal 2 is defined by a standard. The portable control part 20 identifies the turned-on/turned-off pattern representing the start of the optical signal in the image data that is outputted from the image-capturing part 26 during the communication display interval t2 and identifies the start point of the optical signal.

(Communication Display Towards the Portable Terminal 2, and Sequence of State Display on the Portable Terminal 2)

Figure 8:
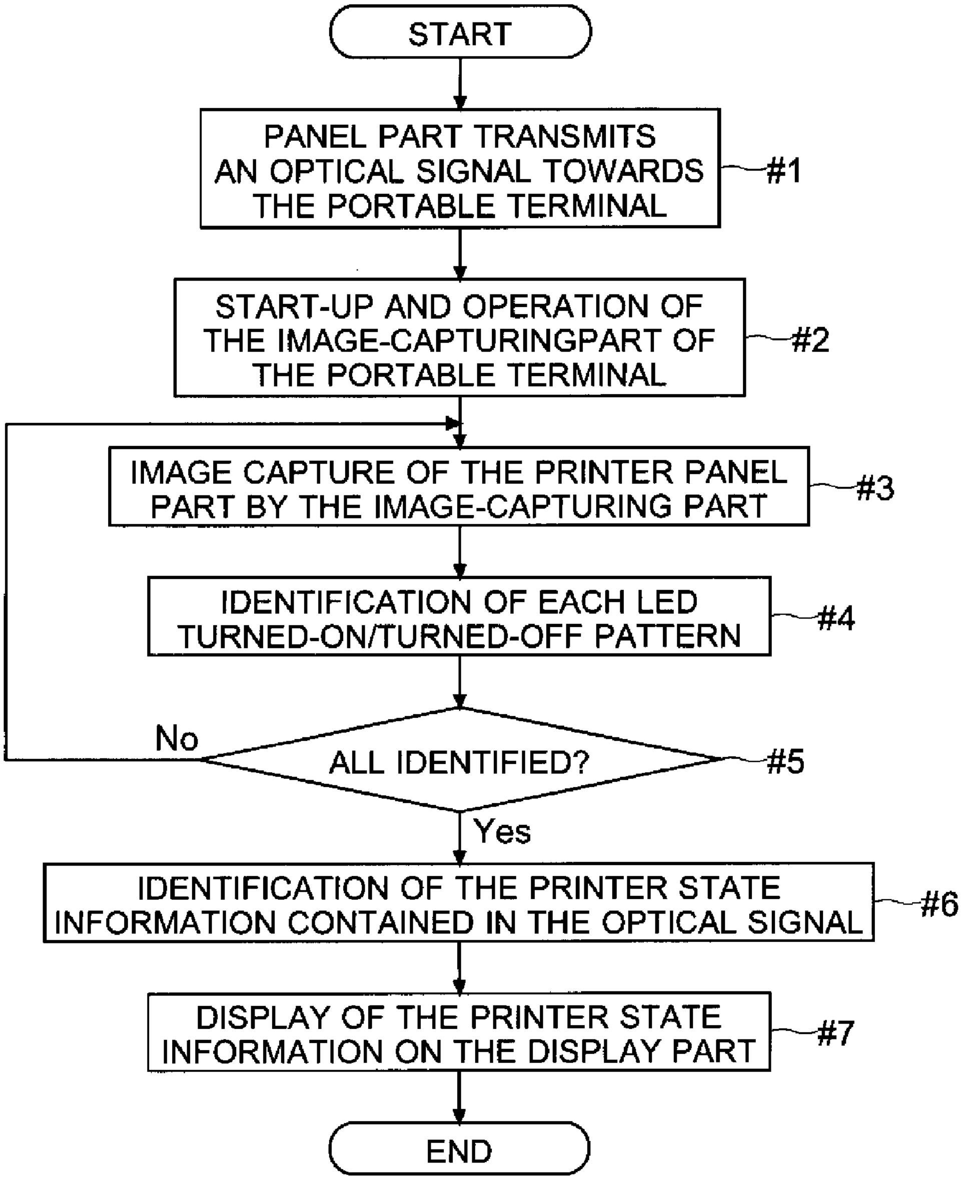
FIG. 8 is a flow chart showing an example of the sequence of communication display towards the portable terminal using the LEDs of the panel part and the sequence of state display by the portable terminal.

An example of the sequence of communication display to the portable terminal 2 and the sequence of state display on the portable terminal 2 in this embodiment are described below with reference to FIG. 8. FIG. 8 is a flow chart showing an example of the sequence of communication display to the portable terminal 2 using the LEDs 51 to 56 of the panel part 11 and the sequence of state display by the portable terminal 2.

First, the start in FIG. 8 is the point in time at which the application 7 is launched using the portable terminal 2 by an operation or the like on the touch panel part 22.

First, when it becomes necessary for the user to confirm the state of the printer 1 when an error occurs, when performing a printing job, or the like, the printer control part 10 sets the communication display interval t2 between normal display intervals t1. During the predetermined communication display interval t2, the turned-on/turned-off pattern of the LEDs 51 to 56 of the panel part 11 is switched, and the panel part 11 is caused to transmit to the portable terminal 2 an optical signal containing state information representing the state of the printer 1 (step 1).

When the optical signal is to be generated, first, the printer control part 10 turns the LEDs 51 to 56 of the panel part 11 on or off in a turned-on/turned-off pattern that indicates the start of the optical signal. Next, the printer control part 10 switches the turned-on/turned-off pattern of the LEDs 51 to 56 of the panel part 11 each time the communication display interval t1 has passed (each time a new communication display interval t2 arrives) in accordance with the standard. Thus, the printer control part 10 sequentially transmits optical signals containing state information concerning the printer 1 to the LEDs 51 to 56 and to the portable terminal 2. After transmitting the state information to the portable terminal 2, the printer control part 10 generates the final optical signal, and the LEDs 51 to 56 of the panel part 11 are made to turn on or off in a turned-on/turned-off pattern that indicates the start of another optical signal. Next, an optical signal containing state information is sequentially transmitted again after passage of each normal display interval t1 (each time a new communication display interval t2 arrives). Thus, when the user needs to confirm the state of the printer 1, the printer control part 10 repeatedly causes the panel part 11 to display the turned-on/turned-off pattern indicating the start of the optical signal and transmit the state information.

On the portable terminal 2, the portable control part 20 launches and operates the image-capturing part 26 by launching the application 7 (step 2). Next, an image of the panel part 11 of the printer 1 is captured using the image-capturing part 26 of the portable terminal 2 by holding up the portable terminal 2 to the panel part 11 of the printer 1 (step 3).

Next, the portable control part 20 identifies the turned-on/turned-off pattern of the LEDs 51 to 56 based on the image data that has been obtained by image capture in the communication display interval t2 (step 4), and, upon transmission of the state of the printer 1, the portable control part 20 confirms whether identification of all of the (sequence of) turned-on/turned-off patterns has occurred (step 5). In other words, the portable control part 20 confirms whether all of the turned-on/turned-off patterns that are to be identified have been identified. For example, the portable control part 20 determines whether identification has occurred for all of the turned-on/turned-off patterns that are to be identified after the turned-on/turned-off pattern indicating the starting point has been identified.

If not all of the turned-on/turned-off patterns have been identified (No in step 5), then the routine returns to step 3. If all of the turned-on/turned-off patterns have been identified (Yes in step 5), then the portable control part 20 identifies the state information of the printer 1 contained in the optical signal during the communication display interval t2 based on the turned-on/turned-off pattern and the standard (step 6). Next, the portable control part 20 displays the identified information on the state of the printer 1 on the display part 21 (step 7→end).

(State Display of the Printer 1 on the Portable Terminal 2)

Figure 9:
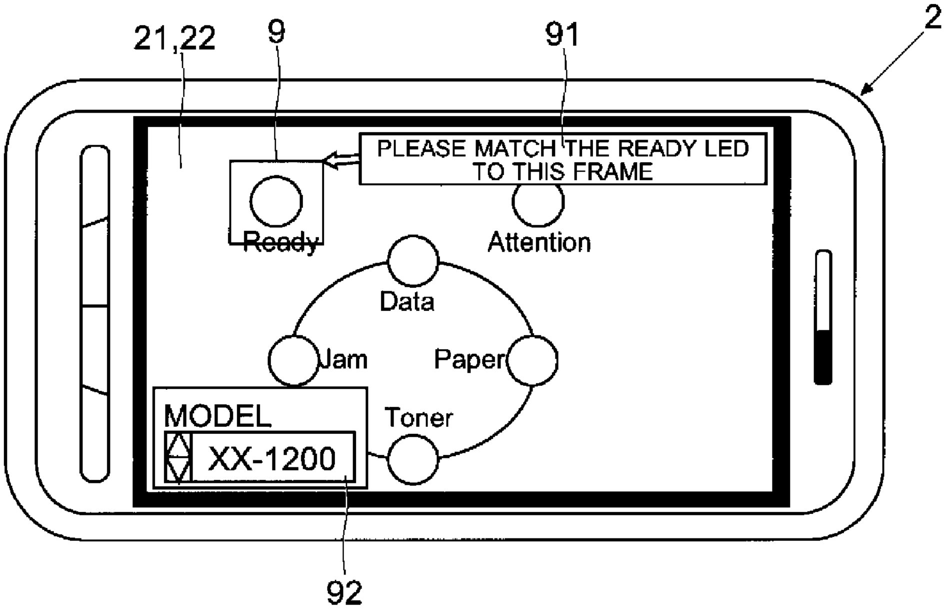
FIG. 9 is a descriptive diagram representing an example of a display on the portable terminal when the optical signals are being acquired (received).
Figure 10:
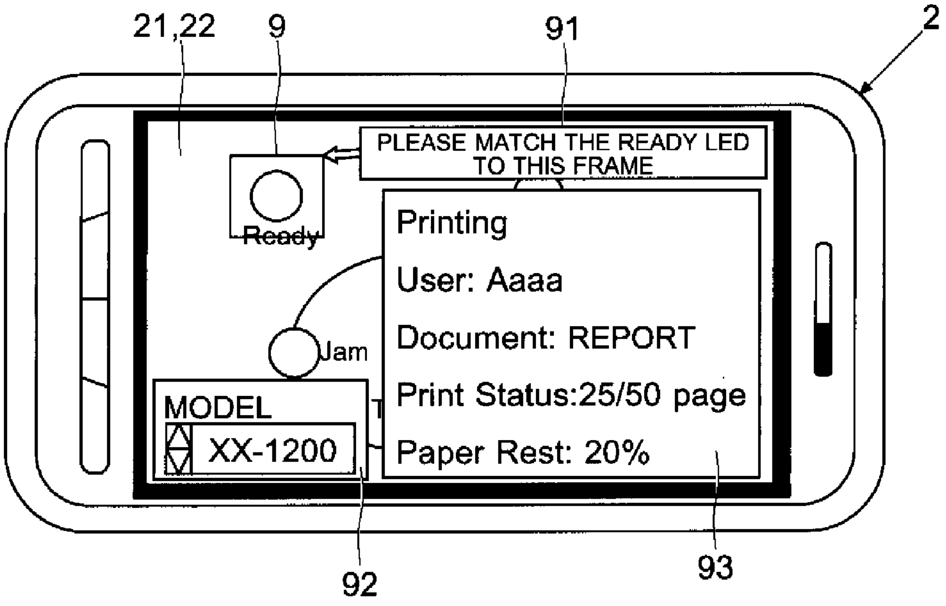
FIG. 10 is a descriptive diagram representing an example of the portable terminal displaying a state in which the printer is printing.
Figure 11:
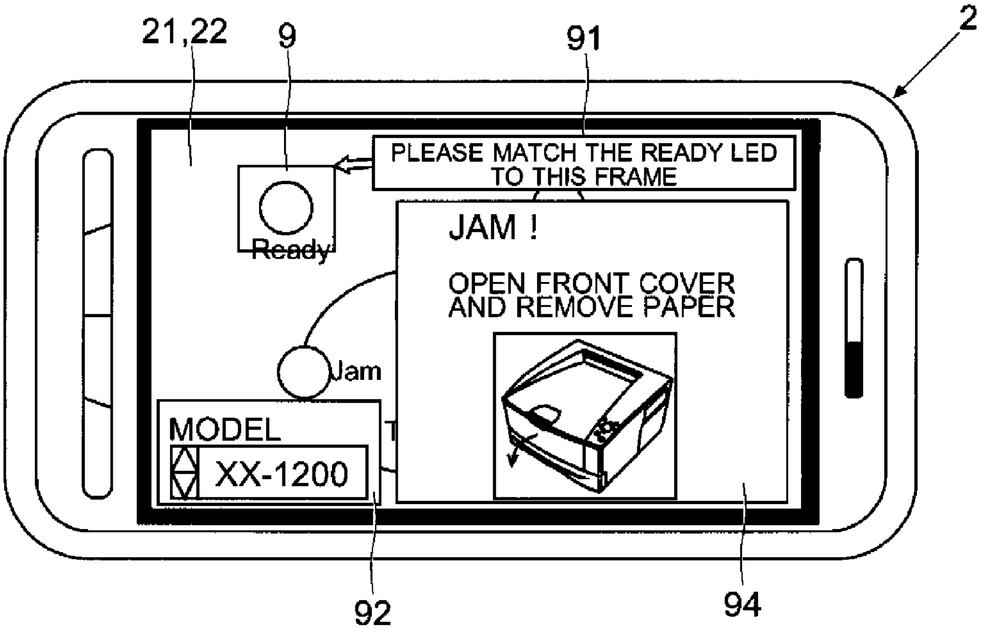
FIG. 11 is a descriptive diagram representing an example of the portable terminal displaying a state of the printer when an error has occurred.
Figure 12:
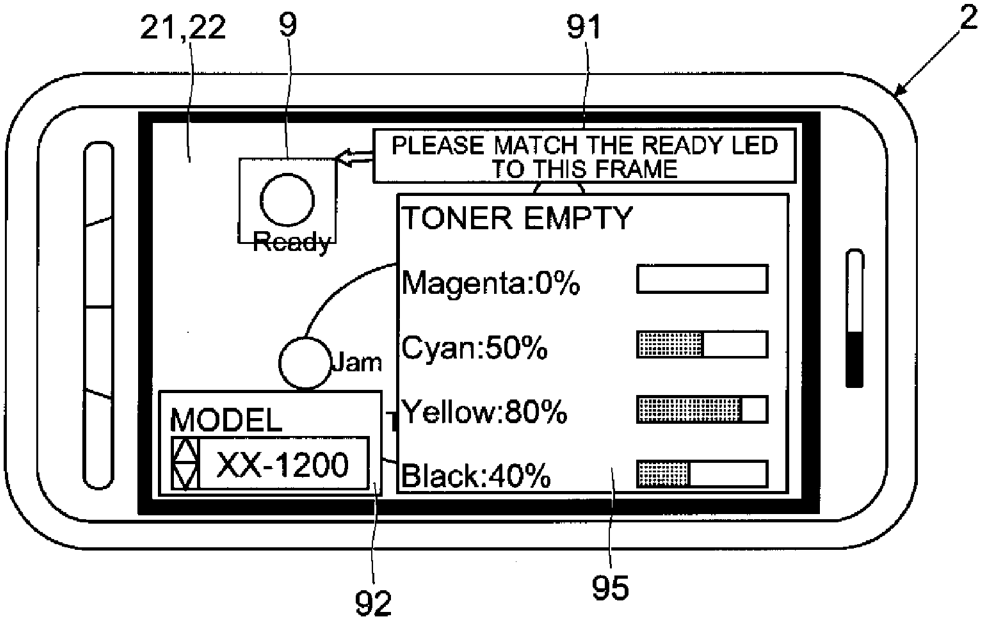
FIG. 12 is a descriptive diagram representing an example of the portable terminal displaying a state the printer when an error has occurred.

Next, an example of state display of the printer 1 on the portable terminal 2 in this embodiment will be described with reference to FIGS. 9 to 12. FIG. 9 is a descriptive diagram representing a display example on the portable terminal 2 during optical signal acquisition (during receipt). FIG. 10 is a descriptive diagram representing an example of state display of the printer 1 on the portable terminal 2 during printing. FIGS. 11 and 12 are explanatory diagrams showing examples of state display of the printer 1 on the portable terminal 2 at the time an error occurs.

In this embodiment, on the portable terminal 2, the portable control part 20 first displays the input image data that has been obtained by image-capturing performed by the image-capturing part 26 (in some cases, image data processed by the image processing part 20*b*) on the display part 21. The image-capturing part 26 outputs image data at a fixed time period to the portable control part 20. For this reason, the portable control part 20 switches the display on the display part 21 at a fixed period based on the image data that is inputted at a fixed period (also referred to as "through display" or "preview display"). This corresponds to, e.g., the display state before the shutter of a digital camera is actuated. The display part 21 of the portable terminal 2 accordingly provides an animated display of the image capture state of the image-capturing part 26. As a result, the user views the display part 21 of the portable terminal 2; confirms the composition, distance to the body to be photographed, or other parameters; and then identifies the image capture state of the image-capturing part 26.

Next, the touch panel part 22 is used in order to touch and launch the application 7 that is used for allowing identification of the information contained in the optical signal by the portable terminal 2 based on the turned-on/turned-off pattern of the LEDs 51 to 56 and for allowing the state of the printer 1 to be displayed at the portable terminal 2. As a result, the portable control part 20 operates the image-capturing part 26, and the image data that has been captured is displayed on the display part 21 (refer to FIG. 9, and the like).

When the application 7 is launched, the user captures an image of the panel part 11 so that all of the LEDs 51 to 56 provided on the panel part 11 of the printer 1 are contained in the image capture field. The portable control part 20, at this time, displays the frame 9 that will contain the LEDs 5 of the panel part 11 on the display part 21. In addition, as shown in FIGS. 9 to 12, the portable control part 20 displays a frame description field 91 for displaying a description of the frame 9 that is displayed on the display part 21. The frame 9, the image data for displaying the frame description field 91, and data showing the display position of the frame 9 and the like on the display part 21 are contained in the application 7.

As shown in FIGS. 9 to 12, the description "Please match the Ready LED to this frame" is contained in the frame description field 91. The user will thus identify a composition that is suitable for capturing an image by the image-capturing part 26 of the portable terminal 2, upon accurately capturing an image of the optical signal that is generated by the panel part 11 of the printer 1.

Thus, with the image-forming system 100, the display part 21 of the portable terminal 2 displays the image capture state of the image-capturing part 26 based on the image data that has been obtained by image-capturing on the image-capturing part 26. Next, based on the application 7, the processing part (portable control part 20) of the portable terminal 2 displays the frame 9 that is to contain the light-emitting elements (LEDs 51 to 56) of the panel part 11 on the display part 21 during display of the image capture state. As a result, image-capturing performed by the image-capturing part 26 can be carried out with the composition favored by the user, upon receiving the optical signal from the panel part 11. Consequently, the information contained in the optical signal can be accurately identified by the processing part of the portable terminal 2.

A model selection field 92 for selecting the model corresponding to the printer 1 that is to be used is provided by the application 7 at a location that is below and to the left of the portable terminal 2. Depending on the model, there will be differences in the standard, number, and installation locations of the LEDs 5 on the panel part 11. Thus, the user can select the model of the printer 1 by an operation involving pressing the model selection field 92.

The portable control part 20 identifies the turned-on or turned-off state of the LEDs 51 to 56 of the panel part 11 based on the image data obtained by image-capturing performed by the image-capturing part 26 in the communication display interval t2. For example, the positions of the pixels corresponding to the LEDs 51 to 56 are set by the application 7 in the image data obtained by image capture by the image-capturing part 26. Thus, for example, the portable control part 20 identifies whether the LEDs 51 to 56 are on or off depending on the pixel values (high, low) of the pixels at the positions corresponding to the LEDs 51 to 56.

Next, the portable control part 20 identifies the content of the optical signal that is generated by the panel part 11 of the printer 1 based on the turned-on/turned-off pattern of the Data LED 52, the JAM LED 53, the Paper LED 54, the Toner LED 55, and the Attention LED 56.

The portable terminal 2 can acquire 5-bit units of information based on a single turned-on/turned-off pattern by the 5 LEDs 52 to 56 being turned on or off. As described below, information such as text can also be transmitted as optical signals from the panel part 11 of the printer 1 to the portable terminal 2. To this end, there are cases where it is necessary for a plurality of turned-on/turned-off patterns to be captured by the image-capturing part 26 of the portable terminal 2 up until completion of transmission of the information representing the state of the printer 1 by the panel part 11. In other words, there are cases where it is necessary to continue capturing images of the panel part 11 over a plurality of repetitions during the communication display interval t2.

For this reason, during reading of the series of turned-on/turned-off patterns, the portable control part 20 may display, on the display part 21, the instruction that image capture and acquisition of the optical signal emitted by the panel part 11 have started, that the optical signal is being received (being read), or that acquisition and identification of information from the optical signal has been completed.

Next, transmission of the optical signal from the panel part 11 of the printer 1 in accordance with parameters, and the display thereof on the display part 21 of the portable terminal 2, will be described with reference to FIGS. 10 to 12.

First, transmission of the optical signal during printing and display on the portable terminal 2 will be described with reference to FIG. 10. For example, during printing, the panel part 11 of the printer 1 causes information related to the job being printed to be transmitted to the portable terminal 2 using the LEDs 51 to 56. For example, by switching the turned-on/turned-off pattern of the five LEDs 52 to 56, the printer control part 10 causes the panel part 11 to transmit to the portable terminal 2 an optical signal that includes the instruction that printing is currently being carried out, information representing the name of the user that is carrying out printing (or the computer name where the printing data has been sent; represented as "Aaaa" in FIG. 10), information representing the data name of the printing data (represented as "Report" in FIG. 10), information representing the number of printed pages relative to all of the pages in the printing job (represented as "25/50 pages" in FIG. 10), and information showing the remaining amount of paper in the cassette 131 based on the output of the remaining paper sensor 82 (represented as "20%" in FIG. 10).

The portable control part 20 confirms the image data that has been obtained by image capture by the image-capturing part 26, and the portable control part 20 then identifies the turned-on/turned-off pattern of the five LEDs 52 to 56. Based on the protocol and the series of turned-on/turned-off patterns, the portable control part 20 then identifies the content of the information that represents the instruction that printing is being carried out, the user name, the data name of the printed data, the total page count, the number of pages that have been printed, as well as information representing the remaining amount of paper in the cassette 131. In other words, the portable control part 20 identifies the state of the printer 1 during printing based on the image data that has been obtained by image capture of the panel part 11 by the image-capturing part 26. Next, the portable control part 20 displays a new state display box 93 on the display part 21 of the portable terminal 2 and displays the state of the printer 1 during printing in the state display box 93.

Thus, with the image-forming system 100, the panel part 11 of the image-forming device (e.g., the printer 1) transmits an optical signal representing the printing parameters during printing, and the processing part (portable control part 20) of the portable terminal 2 displays the state of the image-forming device during printing on the display part 21. As a result, the remaining number of sheets to be printed and the like, as well as the state of the image-forming device during printing, can be readily known.

Next, transmission of the optical signal and display on the portable terminal 2 when an error occurs will be described with reference to FIGS. 11 and 12. The user identifies that an error has occurred as a result of normal state display of the panel part 11 of the printer 1.

When an error has occurred, the panel part 11 of the printer 1, during printing, transmits information related to the error as an optical signal to the portable terminal 2. For example, the printer control part 10 transmits the instruction that an error has occurred, as well as the classification representing the error that has occurred.

For example, FIG. 11 shows an example of display on the portable terminal 2 when a jam has occurred. When a paper jam has been detected, the printer control part 10 causes the panel part 11 to transmit to the portable terminal 2, in the form of an optical signal, information indicating that a jam-related error has occurred, or information indicating the cover that is to be opened in order to remove the jam, based on the outputs of the paper sensors 841 to 843.

The portable control part 20 confirms the image data that has been obtained by image capture of the image-capturing part 26, identifies the turned-on/turned-off pattern of the five LEDs 52 to 56, and identifies the instruction that an error has occurred, the instruction that a jam is the error, and the information showing the cover that is to be opened. In other words, the portable control part 20 identifies the state of the printer 1 in which the error has occurred based on the image data that is obtained by image capture of the panel part 11 by the image-capturing part 26. Then, the portable control part 20 displays a new state display box 94 on the display part 21 of the portable terminal 2 and displays the error that has occurred in the printer 1 or the repair method in the state display box 94.

For example, FIG. 12 shows an example of display on the portable terminal 2 when the toner has run out. When the printer control part 10 detects that the container 6 is empty based on the outputs of the toner sensors 85M to 85Bk, the panel part 11 causes information representing the instruction that toner is empty, information showing the container 6 in which the toner is empty, and information showing the amount of each color remaining in the containers 6 to be transmitted to the portable terminal 2 using optical signals.

The portable control part 20 confirms the image data obtained by image capture by the image-capturing part 26, identifies the turned-on/turned-off pattern of the five LEDs 52 to 56, and, based on the series of turned-on/turned-off patterns and the standard, identifies the instruction that a toner empty error has occurred, information showing the container 6 that is empty, and information showing the remaining amount of each color in the containers 6. In other words, the portable control part 20 identifies the state of the printer 1 in which the toner empty error has occurred based on the image data that has been obtained by image capture of the panel part 11 by the image-capturing part 26. Next, the portable control part 20 displays a new state display box 95 on the display part 21 of the portable terminal 2, and, for example, the instruction that toner has run out and the amount of each color remaining in the containers 6 are displayed in the state display box 95.

Thus, with the image-forming system 100, when the occurrence of an error has been detected by the state-detecting part 8 (e.g., the cassette sensor 81, the remaining paper sensor 82, the out-of-paper sensor 83, the paper sensors 841 to 843, the toner sensors 85M to 85Bk, the upper surface cover sensor 86, and the front surface cover sensor 87), the panel part 11 of the image-forming device (e.g., the printer 1) transmits an optical signal representing at least the type of error that has occurred, and the processing part (portable control part 20) of the portable terminal 2 displays the error that has occurred on the display part 21. As a result, the error that has occurred can be directly identified by holding the image-capturing part 26 of the portable terminal 2 in front of the panel part 11.

Thus, the image-forming system 100 of this embodiment comprises the image-forming device (e.g., the printer 1) and the portable terminal 2, where the image-forming device has the printing engine part 12 that carries out printing (e.g., the paper feed part 13, the transport path 14, the image-forming part 15, the conveyor belt unit 16, and the fixing part 17), the state-detecting part 8 for detecting the state of the image-forming device (e.g., the cassette sensor 81, the remaining paper sensor 82, the out-of-paper sensor 83, the paper sensors 841 to 843, the toner sensors 85M to 85Bk, the upper surface cover sensor 86, and the front surface cover sensor 87), and the panel part 11 that comprises a plurality of light-emitting elements representing the state of the image-forming device (LEDs 51 to 56), and that transmit optical signals that contain state information concerning the image-forming device to the portable terminal 2 by switching the turned-on/turned-off pattern of the plurality of light-emitting elements during display of the state of the image-forming device to a user by the light-emitting elements; and where the portable terminal 2 comprises the image-capturing part 26, the storage part that stores the application 7 (flash memory 24), the display part 21 that displays images and screens, and the processing part (portable control part 20) that identifies the state information concerning the image-forming device contained in the optical signals from the image data that is obtained by image capture of the panel part 11 by the image-capturing part 26 based on the application 7 and that displays the state of the image-forming device on the display part 21. Similarly, this disclosure may be taken as an image-forming device for the image-forming system 100 and as a portable terminal 2 for the image-forming system 100.

According to the image-forming system 100, the image-forming device (e.g., the printer 1), and the portable terminal 2, the user can identify the state of the image-forming device at the portable terminal 2 merely by capturing an image of the light-emitting elements (LEDs 51 to 56) of the image-forming device on the portable terminal 2. Consequently, the user can complete the operation without having to identify the turned-on/turned-off pattern of the light-emitting elements that have been switched multiple times or having to interpret the message sent by the image-forming device by consulting a manual or the like, as has been the case in the past. There is no increase in burden on the user even if a large volume of state information concerning the image-forming device is contained in the optical signal. In addition, in order to determine the state of the image-forming device, the user need not move to the installation location of the computer 200 that displays the state of the image-forming device, as has been the case in the past. Thus, the message that has been generated by the image-forming device can be accurately and readily identified by the user at the portable terminal 2. Thus, the state of the image-forming device can be readily and accurately identified, thereby increasing ease of use.

Another embodiment is described below. Although the state of the printer 1 in which an error has occurred has been described by providing an example in which a jam has occurred or toner has run out, with other errors such as image data receiving errors at the data communication part 18 of the printer 1 or paper empty errors at the cassette 131 of the paper feed part 13, the panel part 11 of the printer 1 can transmit an optical signal to the portable terminal 2, and state display of the printer 1 at the portable terminal 2 can be carried out based on image data obtained by image capture.

With the embodiment described above, an example was presented in which in a state where the printer 1 is printing, or a state where an error has occurred with the printer 1, the panel part 11 of the printer 1 transmits an optical signal to the portable terminal 2, and state display of the printer 1 is carried out on the portable terminal 2 based on the image data obtained by image capture. However, it is not merely when printing is occurring or an error has occurred, but also in a non-printing standby mode that the panel part 11 can transmit an optical signal to the portable terminal 2, and state display of the printer 1 on the portable terminal 2 can be carried out based on image data that has been obtained by image capture.

For example, during standby, the printer control part 10 transmits an optical signal to the panel part 11 that contains information showing whether the cassette 131 is in an inserted or removed state based on the output of the cassette sensor 81, information representing the remaining amount of paper based on the output of the remaining paper sensor 82, information representing the amount of each color remaining in the container 6 based on the outputs of the toner sensors 85M to 85Bk, and information representing the opened and closed [state] of each cover based on the outputs of the upper surface cover sensor 86 or the front surface cover sensor 87. The user can know the state of the printer 1 during standby by using the portable terminal 2.

In addition, in the embodiment described above, a smartphone was described as an example of the portable terminal 2, but any device may be used as an example, provided that it has a image-capturing part 26, a display part 21, a wireless communication part 29 (communication part), a portable control part 20, or the like; and this disclosure may be applied, for example, to cellular telephones, portable data terminals (PDAs), portable notebook computers, portable game devices, and the like.

Embodiments of the disclosure have been described, but the scope of the disclosure is not restricted by these embodiments; various modifications may be made within a scope that does not deviate from the spirit of the disclosure.

What is claimed is:

1. An image-forming system comprising:

an image-forming device and a portable terminal, the image-forming device having:

a printing engine part for carrying out printing, a state-detecting part for detecting a state of the image-forming device, and a panel part that includes a plurality of light-emitting elements for displaying the state of the image-forming device, the panel part adapted such that, while the state of the image-forming device is being displayed to a user by the light-emitting elements, a turned-on/turned-off pattern of the plurality of light-emitting elements is switched, and optical signals destined for the portable terminal and including information on the state of the image-forming device are transmitted; and the portable terminal having an image-capturing part, a storage part for storing an application, a display part for displaying an image and a screen, and a processing part for identifying, based on the application, the information on the state of the image-forming device included in the optical signals from image data obtained as a result of the image-capturing part capturing an image of the panel part, and for displaying, based on the application, the state of the image-forming device on the display part, wherein the panel part uses one of the light-emitting elements from among the plurality of light-emitting elements as a reference light-emitting element for relaying to the portable terminal that the optical signals are being transmitted, the panel part switches displayed contents on a time-division basis such that display of state to the user is performed during normal display intervals and display of communication to the portable terminal, which is different from the display of state to the user, is performed during a communication display interval between the normal display intervals, the panel part switches a light-emission state of the reference light-emitting element to notify the portable terminal of switching between the normal and communication display intervals, and the processing part identifies state information contained in the optical signal from the image data obtained by image capturing performed by the image-capturing part during the communication display interval.

2. The image-forming system according to claim 1, the image-forming device having a code display including information showing a site for downloading the application corresponding to a model of the image-forming device, the portable terminal having a communication part for communicating externally, the processing part identifying the site for downloading the application based on image data obtained as a result of the image-capturing part capturing an image of the code display, and the communication part acquiring the application corresponding to the image-forming device from the identified download site.

3. The image-forming system according to claim 1, the display part displaying an image-capturing state of the image-capturing part based on the image data obtained by the image-capturing performed by the image-capturing part; and the processing part displaying on the display part, based on the application, a frame for containing the light-emitting elements of the panel part when the image-capturing state is displayed.

4. The image-forming system according to claim 1, the panel part transmitting an optical signal representing printing parameters during printing, and the processing part displaying on the display part the state of the image-forming device during printing.

5. The image-forming system according to claim 1, the panel part transmitting, when the occurrence of an error has been detected by the state-detecting part, an optical signal representing at least the type of error that has occurred; and the processing part displaying on the display part the error that has occurred.

6. The image-forming system according to claim 1, the panel part causing the light-emitting elements to be turned on or off, the length of a communication display interval during which the optical signal is emitted and communication display is carried out being a length that cannot be identified by the human eye when the light-emitting elements are turned on or off.

7. An image-forming device comprising:

a printing engine part for carrying out printing;

a state-detecting part for detecting a state of the image-forming device, and a panel part comprising a plurality of light-emitting elements for displaying the state of the image-forming device, the panel part adapted such that, while the state of the image-forming device is being displayed to a user by the light-emitting elements, a turned-on/turned-off pattern of the plurality of light-emitting elements is switched, and optical signals destined for the portable terminal and including information on the state of the image-forming device are transmitted;

wherein, the panel part uses one of the light-emitting elements from among the plurality of light-emitting elements as a reference light-emitting element for relaying to the portable terminal that the optical signals are being transmitted, the panel part switches displayed contents on a time-division basis such that display of state to the user is performed during normal display intervals and display of communication to the portable terminal, which is different from the display of state to the user, is performed during a communication display interval between the normal display intervals, the panel part switches a light-emission state of the reference light-emitting element to notify the portable terminal of switching between the normal and communication display intervals.

8. The image-forming device according to claim 7, the image-forming device having a code display including information indicating a site for downloading the application corresponding to a model type.

9. The image-forming device according to claim 7, the panel part transmitting an optical signal representing printing parameters when the occurrence of an error has been detected by the state-detecting part.

10. The image-forming device according to claim 7, the panel part causing the light-emitting elements to be turned on or off, the length of a communication display interval during which the optical signal is emitted and communication display is carried out being a length that cannot be identified by the human eye when the light-emitting elements are turned on or off.

11. A method for controlling an image-forming system comprising the steps of:

displaying a state of an image-forming device to a user using a plurality of light-emitting elements, the light-emitting elements adapted for displaying the state of the image-forming device;

switching a turned-on/turned-off pattern of the plurality of light-emitting elements while the state of the image-forming device is being displayed, and transmitting optical signals destined for a portable terminal and including information on the state of the image-forming device;

identifying, based on an application, the information on the state of the image-forming device included in the optical signals from image data obtained as a result of an image-capturing part of the portable terminal capturing an image of a panel part of the image-forming device; and displaying the state of the image-forming device on a display part of the portable terminal;

wherein, one of the light-emitting elements from among the plurality of light-emitting elements being used as a reference light-emitting element for relaying to the portable terminal that the optical signal is being transmitted; and the reference light-emitting element being turned on or off during transmission of the optical signal; and making the panel part switch display contents on a time-division basis such that display of state to the user is performed during normal display intervals and optical signal transmission to the portable terminal is performed during a communication display interval between the normal display intervals; and making the panel part switch a light-emission state of the reference light-emitting element so that the optical signal destined for the portable terminal informs the portable terminal of switching between the normal and communication display intervals; and identifying state information included in the optical signal being identified from image data obtained by image-capturing performed by the portable terminal while the optical signal is being transmitted, in a state where the reference light-emitting element is turned on or off.

12. The method for controlling an image-forming system according to claim 11, acquiring image data as a result of the image-capturing part capturing an image of a code display including information showing a site for downloading the application corresponding to a model of the image-forming device, identifying the site for downloading the application based on the image data, and a communication part of the portable terminal acquiring the application corresponding to the image-forming device from the identified download site.

13. The method for controlling an image-forming system according to claim 11, the image-capture state of the image-capturing part being displayed on the display part of the portable terminal based on image data obtained by image-capturing performed using the image-capturing part; and a frame for containing the light-emitting elements being displayed on the display part while the image capture state is being displayed.

14. The method for controlling an image-forming system according to claim 11, an optical signal representing printing parameters being transmitted during printing; and the state of the image-forming device during printing being displayed on the display part of the portable terminal.

15. The method for controlling an image-forming system according to claim 11, the occurrence of an error being detected by a state-detecting part, and, when the occurrence of the error has been detected, an optical signal representing at least the type of the error that has occurred being transmitted, and the transmitted error being displayed on the display part of the portable terminal.

16. The method for controlling an image-forming system according to claim 11, the light-emitting elements being turned on or off, the length of a communication display interval during which the optical signals are emitted and communication display is carried out being a length that cannot be identified by the human eye when the optical signals have been emitted by the turning on or off of the light-emitting elements.

* * * * *